(12) United States Patent
Uh

(10) Patent No.: US 7,951,485 B2
(45) Date of Patent: May 31, 2011

(54) LITHIUM RECHARGEABLE BATTERY HAVING AN INSULATING CASE

(75) Inventor: Hwa Il Uh, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1015 days.

(21) Appl. No.: 11/380,103

(22) Filed: Apr. 25, 2006

(65) Prior Publication Data

US 2006/0246349 A1 Nov. 2, 2006

(30) Foreign Application Priority Data

Apr. 26, 2005 (KR) .................. 10-2005-0034750

(51) Int. Cl.
*H01M 2/04* (2006.01)
*H01M 2/06* (2006.01)
*H01M 2/08* (2006.01)
*H01M 2/10* (2006.01)

(52) U.S. Cl. .......... 429/175; 429/65; 429/100; 429/121; 429/161; 429/170; 429/171; 429/177; 429/182; 429/186

(58) Field of Classification Search ............ 429/94, 429/65, 100, 121, 161, 171, 175, 177, 182, 429/186
See application file for complete search history.

(56) References Cited

U.S. PATENT DOCUMENTS

| 2001/0008725 A1* | 7/2001 | Howard ................. 429/94 |
| 2004/0115521 A1* | 6/2004 | Cho ..................... 429/72 |
| 2005/0056957 A1* | 3/2005 | Hira et al. ............ 264/46.8 |

FOREIGN PATENT DOCUMENTS

| CN | 1512605 | 7/2004 |
| JP | 07-312209 | 11/1995 |
| JP | 10-269999 | * 10/1998 |
| JP | 2000-030671 | 1/2000 |
| JP | 2001-229898 | * 8/2001 |
| JP | 2002-279944 | 9/2002 |
| JP | 2004-214181 | 7/2004 |
| JP | 2004-253381 | 9/2004 |
| JP | 2004-311395 | 11/2004 |
| JP | 2004-311401 | 11/2004 |
| KR | 10-2006-0034125 | 4/2006 |
| KR | 10-0571234 | 4/2006 |

* cited by examiner

*Primary Examiner* — Ula C Ruddock
*Assistant Examiner* — Amanda Barrow
(74) *Attorney, Agent, or Firm* — H.C. Park & Associates, PLC

(57) ABSTRACT

A lithium rechargeable battery includes an electrode assembly arranged in a can and an insulating case positioned at an upper portion of the electrode assembly. The insulating case includes at least one protrusion protruding toward an inner wall of the can.

20 Claims, 5 Drawing Sheets

LITHIUM RECHARGEABLE BATTERY HAVING AN INSULATING CASE

CROSS REFERENCE TO RELATED APPLICATION

This application claims priority to and the benefit of Korean Patent Application No. 10-2005-0034750, filed on Apr. 26, 2005, which is hereby incorporated by reference for all purposes as if fully set forth herein.

BACKGROUND OF THE INVENTION

1. Field of the Invention

The present invention relates to a lithium rechargeable battery. More particularly, the present invention relates to a lithium rechargeable battery which may prevent an insulating case from moving inside a lithium rechargeable battery can.

2. Discussion of the Background

Small batteries with high capacities have become increasingly necessary as power sources in portable electronic appliances as portable electronic appliances are made lighter and more compact. Lithium rechargeable batteries are increasingly used in the industry because they have a high energy density per unit weight and an operating voltage of 3.6V, which is about three times larger than that of nickel-hydrogen or nickel-cadmium batteries.

Lithium rechargeable batteries create electric energy by oxidation and reduction reactions that occur during intercalation and deintercalation of lithium ions at the positive and negative electrodes. Materials that enable lithium ions to undergo reversible intercalation and deintercalation are used as the active materials of the positive and negative electrodes. An organic electrolyte or a polymer electrolyte may be used to fill the space between the positive and negative electrodes.

Lithium-containing metal oxide may be used as the positive electrode active material of the lithium rechargeable batteries. Examples of a lithium-containing metal oxide include lithium cobalt oxide ($LiCoO_2$), lithium nickel oxide ($LiNiO_2$), and lithium manganese oxide ($LiMnO_2$).

Lithium or lithium alloy was conventionally used as the negative electrode active material. Lithium has the drawback that the batteries tend to short-circuit and explode due to dendrite formation. To overcome this problem, lithium has been replaced by carbon-based materials, including amorphous and crystalline carbon. Lithium rechargeable batteries may be manufactured in various shapes including cylinders, squares, and pouches.

FIG. 1 is an exploded perspective view showing a conventional lithium rechargeable battery.

Referring to FIG. 1, a lithium rechargeable battery may be formed by placing an electrode assembly 12 including a first electrode 13, a second electrode 15, a separator 14, and an electrolyte into a can 10 and sealing an opening of the can 10 with a cap assembly 20.

The cap assembly 20 may include a cap plate 40, an insulation plate 50, a terminal plate 60, and an electrode terminal 30. The cap assembly 20 may be coupled to the opening of the can 10 and to a separate insulation case 70 that seals the can 10.

The cap plate 40 may be made from a metal plate having a size and a shape corresponding to the opening of the can 10. The cap plate 40 may have a terminal through-hole 41 of a predetermined size arranged at its center portion, into which the electrode terminal 30 may be inserted. A tubular gasket 35 may be coupled to the outer surface of the electrode terminal 30 to electrically insulate the electrode terminal 30 from the cap plate 40. In addition, an electrolyte injection hole 42 with a predetermined size may be arranged at one side of the cap plate 40 and a safety vent (not shown) may be arranged at another side of the cap plate 40. The safety vent may be integrally formed with the cap plate 40 by reducing the thickness of the cap plate 40. The cap assembly 20 may be coupled with the opening of the can 10. An electrolyte may be injected via the electrolyte injection hole 42, and the electrolyte injection hole 42 may then be sealed by a plug 43.

The electrode terminal 30 may be coupled with a second electrode tap 17 of the second electrode 15 or a first electrode tap 16 of the first electrode 13, so that the electrode terminal 30 may serve as a second electrode terminal or a first electrode terminal. Insulating tape 18 may be wound around portions of the first electrode tap 16 and the second electrode tap 17 drawn from the electrode assembly 12 to prevent a short circuit between the first electrode 13 and the second electrode 15. The first electrode 13 and the second electrode 15 may serve as a positive electrode and a negative electrode, respectively, or vice versa.

In a lithium rechargeable battery having the structure described above, the insulating case 70 may be arranged on the upper portion of the electrode assembly 12. However, the insulating case 70 may be easily moved if a physical impact is applied to the battery during a standard test, such as a drop test. If the insulating case 70 is moved, the first electrode tap 16 and the second electrode tap 17 extending upward through the insulating case 70 may also be moved, thereby causing a short circuit between the first electrode 13 and the second electrode 15.

SUMMARY OF THE INVENTION

The present invention provides a lithium rechargeable battery that includes an insulating case having a protrusion for preventing the insulating case from moving, thereby improving the safety of the lithium rechargeable battery.

Additional features of the invention will be set forth in the description which follows, and in part will be apparent from the description, or may be learned by practice of the invention.

The present invention discloses a lithium rechargeable battery that includes a can; an electrode assembly arranged inside the can; and an insulating case arranged at an upper portion of the electrode assembly, where the insulating case includes at least one protrusion protruding toward an inner wall of the can.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrated embodiments of the invention and together with the description serve to explain the principles of the invention.

FIG. 2b shows a top view of the insulating case shown in FIG. 2a.

DETAILED DESCRIPTION OF THE ILLUSTRATED EMBODIMENTS

Figure 1:
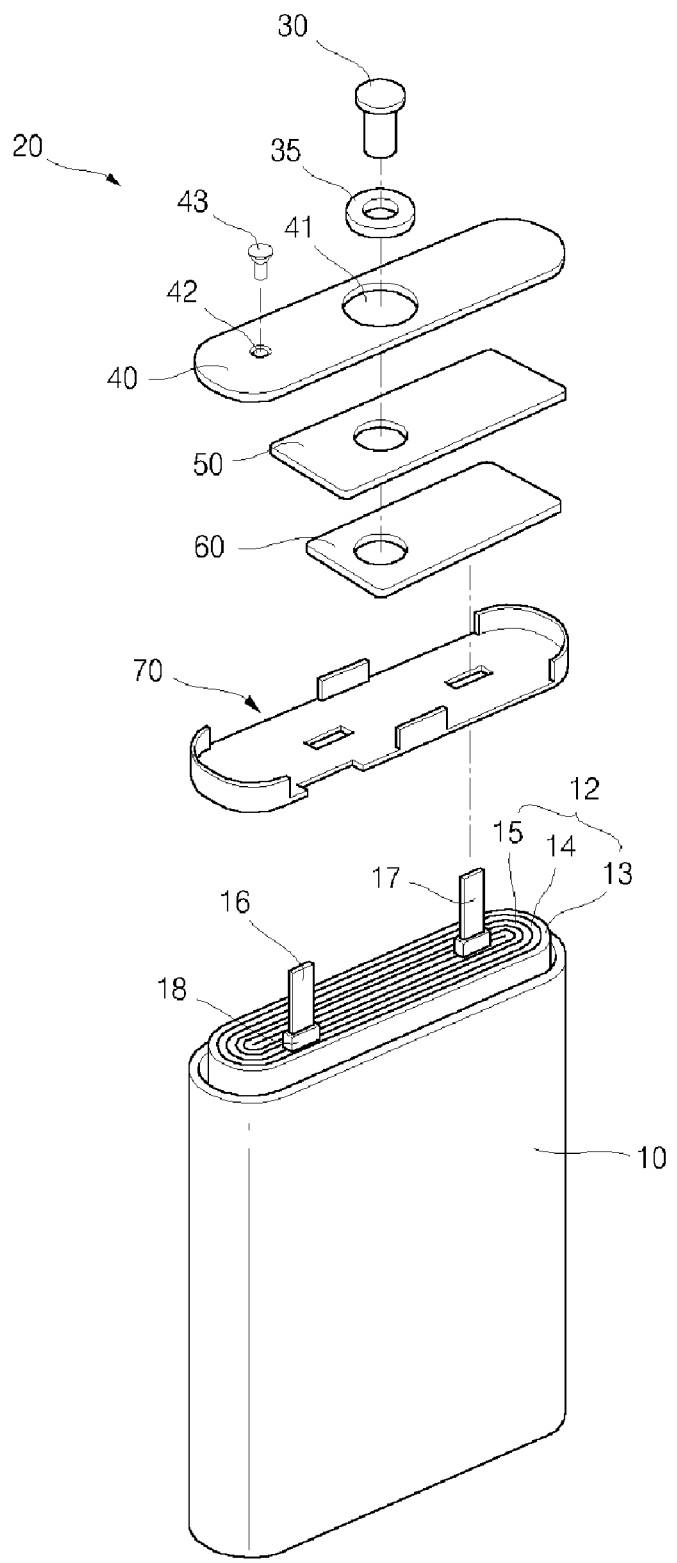
FIG. 1 shows an exploded perspective view illustrating a conventional lithium rechargeable battery.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

According to an exemplary embodiment of the present invention, a lithium rechargeable battery may include an insulation case provided with at least one protrusion protruding toward an inner wall of the can to prevent the insulating case from moving.

Figure 2A:
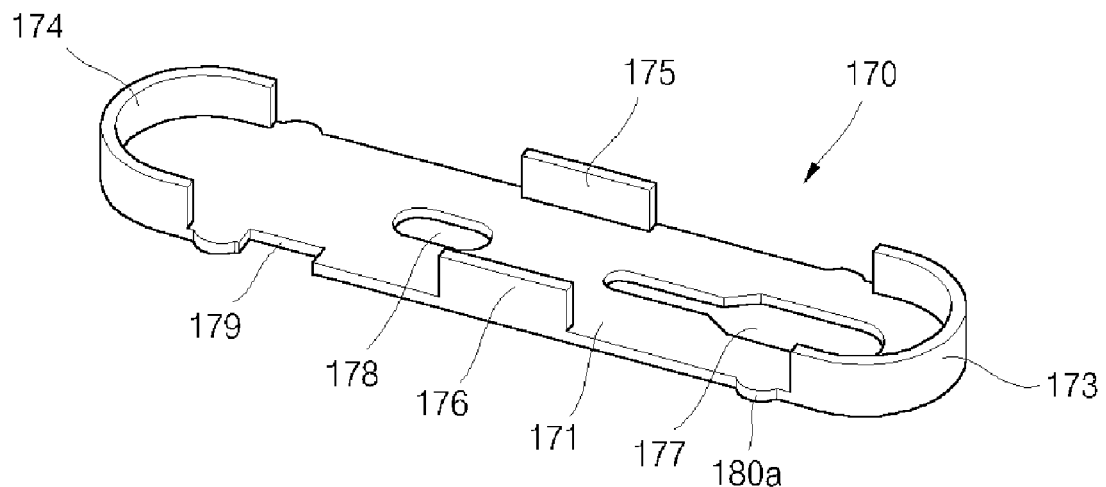
FIG. 2a shows an exploded perspective view illustrating an insulating case of a lithium rechargeable battery according to an exemplary embodiment of the present invention.
Figure 2B:
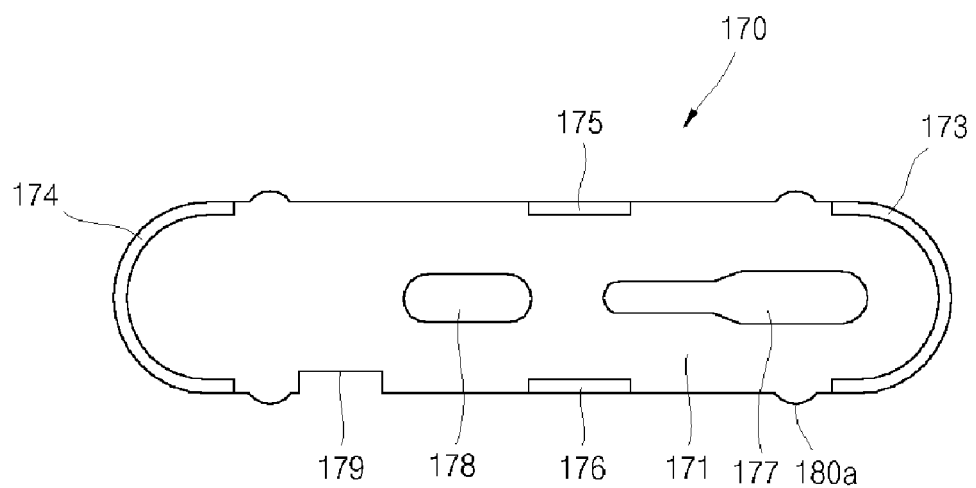

Referring to FIG. 2a and FIG. 2b, an insulating case 170 may include a flat plate type body section 171 and protrusions 180a arranged at periphery portions of the body section 171.

The body section 171 may be a flat plate having a size and a shape corresponding to an upper opening of the lithium rechargeable battery can. The body section 171 may electrically insulate an electrode assembly from a cap assembly.

The protrusions 180a arranged at periphery portions of the body section 171 may have a semicircular sectional shape. Two pairs of protrusions 180a may be arranged at the long lateral side of the body section 171 in the vicinity of the corner portions of the body section 171. The protrusions 180a may be arranged opposite to each other and may protrude toward an inner wall of the can to prevent the insulating case 170 from moving when it is arranged in the can. The protrusions 180a may be integrally formed with the body section 171.

Support flanges 173 and 174 may be arranged at both longitudinal end portions of the body section 171. The support flanges 173 and 174 may protrude upward to a predetermined height from both longitudinal end portions of the body section 171 along the short lateral sides of the body section 171. The support flanges 173 and 174 may support the body section 171 and allow the insulating case 170 to make close contact with the inner wall of the can, thereby preventing the insulating case 170 from moving within the can. In addition, the electrode tap may extend upward through an electrode tap hole 177 arranged in the body section 171, and the support flanges 173 and 174 may prevent the electrode tap from making contact with the inner wall of the can, which may have a different polarity from the electrode tap.

In addition, at least one support block 175 or 176 may be arranged at a predetermined portion of the long lateral sides of the body section 171. The support blocks 175 and 176 may protrude upward to a predetermined height from the long lateral sides of the body section 171. The support blocks 175 and 176 may have a height identical to the height of the support flanges 173 and 174. The support blocks 175 and 176 may reinforce the strength of the long lateral sides of the body section 171, which may be weaker than the short lateral sides of the body section 171. The support blocks 175 and 176 may thus prevent the body section 171 from being deformed by physical impacts applied to the lithium rechargeable battery.

The support flanges 173 and 174 and the support blocks 175 and 176 may be integrally formed with the body section 171.

The electrode tap hole 177 may serve as a passage for drawing the electrode tap and may be arranged at one side of the body section 171. An electrolyte injection hole 178 may be arranged at another side of the body section 171 to allow the electrolyte to be easily injected into the electrode assembly. In addition, a recess 179 having a predetermined width may be arranged at the long lateral side of the body section 171 to provide a space for drawing the other electrode tap.

Figure 3:
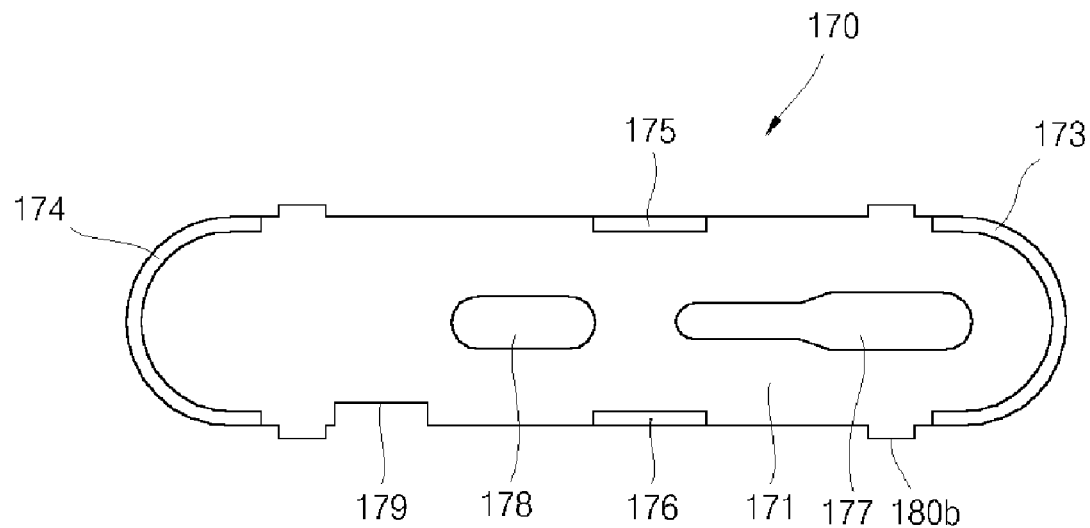
FIG. 3 shows a top view illustrating an insulating case of a lithium rechargeable battery according to an exemplary embodiment of the present invention.

Referring to FIG. 3, two pairs of protrusions 180b having rectangular sectional shapes may be arranged at the long lateral sides of the body section 171 in the vicinity of the corner portions of the body section 171 and may be arranged opposite to each other.

Figure 4:
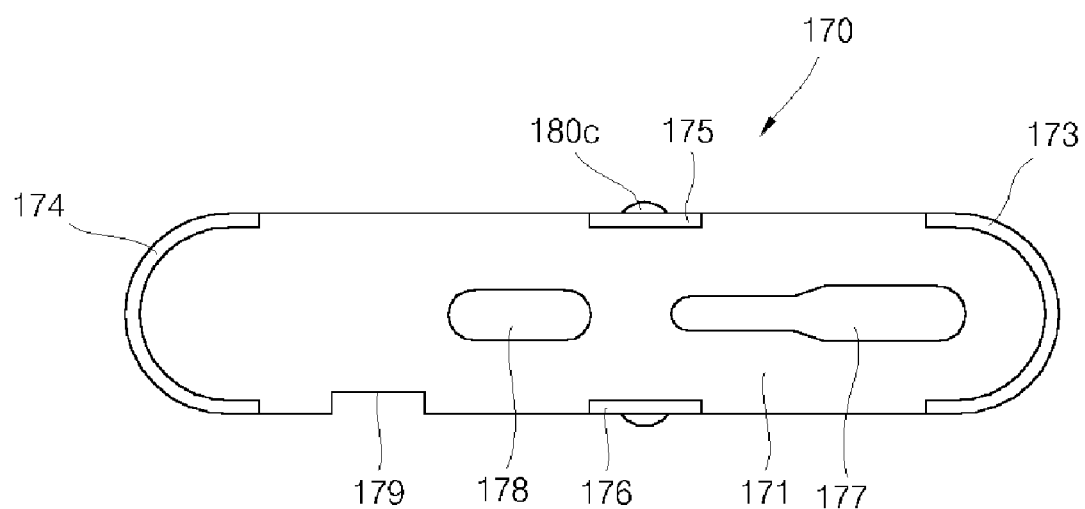
FIG. 4 shows a top view illustrating an insulating case of a lithium rechargeable battery according to an exemplary embodiment of the present invention.

Referring to FIG. 4, a pair of protrusions 180c having semicircular sectional shapes may be arranged at the center portion of the long lateral sides of the body section 171 and may be arranged opposite to each other.

Figure 5:
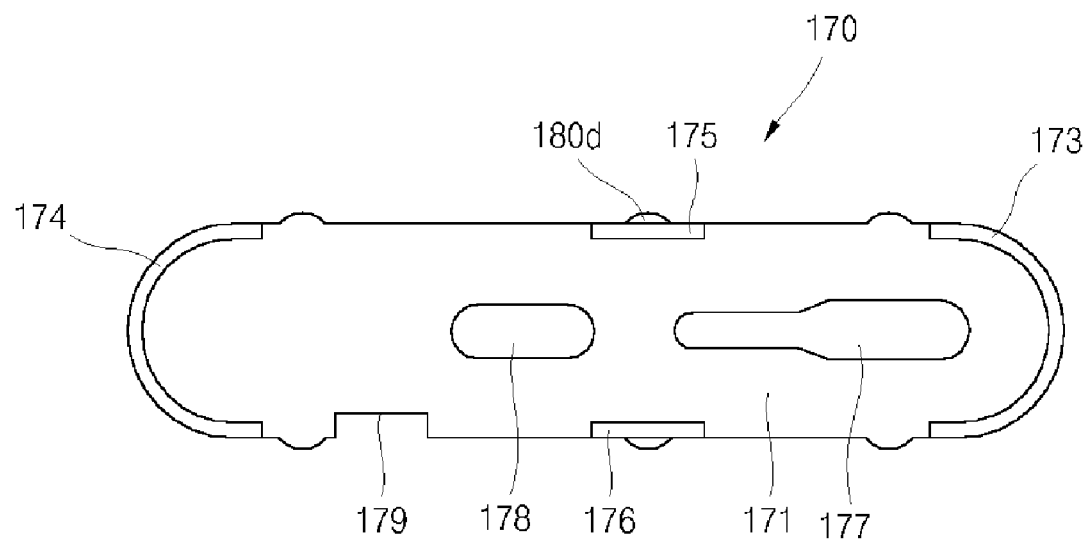
FIG. 5 shows a top view illustrating an insulating case of a lithium rechargeable battery according to an exemplary embodiment of the present invention.

Referring to FIG. 5, two pairs of protrusions having semicircular sectional shapes may be arranged at the long-lateral sides of the body section 171 in the vicinity of the corner portions of the body section 171 and may be arranged opposite to each other. Further, a pair of protrusions 180d having semicircular sectional shapes may be arranged at the center portions of the long lateral sides of the body section 171 and may be arranged opposite to each other.

Figure 6:
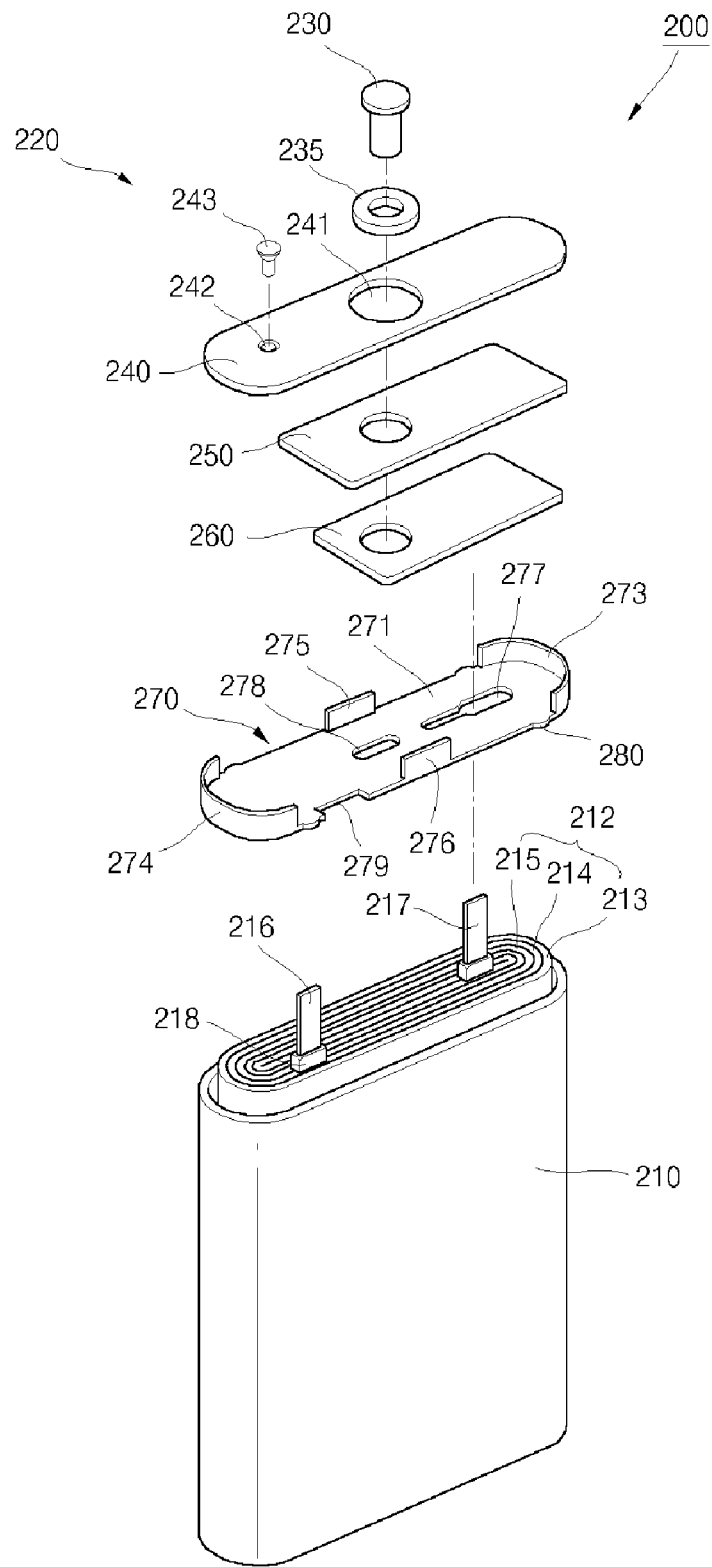
FIG. 6 shows an exploded perspective view illustrating a lithium rechargeable battery according to an exemplary embodiment of the present invention.

FIG. 6 is an exploded perspective view illustrating a lithium rechargeable battery 200 according to an exemplary embodiment of the present invention.

Referring to FIG. 6, the lithium rechargeable battery 200 according to an exemplary embodiment of the present invention may include a can 210, an electrode assembly 212 arranged in the can 210, and a cap assembly 220 coupled to an upper end portion of the can 210.

The can 210 may be made of metal and may have a box shape, in which an upper portion of the can 210 is open. The can 210 may be made of aluminum, an aluminum alloy, or a lightweight and flexible stainless steel. The can 210 may serve as a positive terminal or a negative terminal.

The electrode assembly 212 may include a first electrode 213, a second electrode 215, and a separator 214. The first electrode 213 and the second electrode 215 may be stacked with the separator 214 interposed between them and then wound in the shape of a jellyroll. A first electrode tap 216 may be coupled with the first electrode 213 and a second electrode tap 217 may be coupled with to the second electrode 215 so that the first electrode tap 216 and the second electrode tap 217 protrude upward out of the can 210. The electrode taps may be coupled to their respective electrodes by conductive adhesive or by a welding method, such as laser welding, ultrasonic welding, or resistance welding.

The first electrode 213 and the second electrode 215 may have opposite polarities and may serve as either a positive electrode or a negative electrode. In addition, the first electrode 213 and the second electrode 215 may include electrode collectors and electrode active materials. The electrode active material may be positive and negative electrode active materials and may be coated on at least one surface of the positive and negative electrode collectors, respectively.

The positive electrode collector may be made of stainless steel, nickel, aluminum, titanium, an alloy of these elements, aluminum treated with carbon, nickel, titanium or silver, or stainless steel treated with carbon, nickel, titanium or silver. The negative electrode collector may be made of stainless steel, nickel, copper, titanium, an alloy of these elements, copper treated with carbon, nickel, titanium or silver, or stainless steel treated with carbon, nickel, titanium or silver.

Lithium containing transition metal oxide or lithium chalcogenide compound, such as $LiCoO_2$, $LiNiO_2$, $LiMnO_2$, $LiMn_2O_4$, or $LiN_{1-x-y}CO_xM_yO_2$ ($0 \leq x \leq 1$, $0 \leq y \leq 1$, $0 \leq x+y \leq 1$, wherein M is a metal, such as Al, Sr, Mg, or La) may be used as positive electrode active materials. Carbon-based materials, such as crystalline carbon, amorphous carbon, carbon compounds, or carbon fiber, lithium metals or lithium alloys may be used as negative electrode active materials.

The separator 214 may prevent a short circuit between the first electrode 213 and the second electrode 215 and may also provide a passage for lithium ions. The separator 214 may be made of a polyolefin-based polymer, such as polypropylene or polyethylene, and may be in the form of a film, a multiple film, a micro-porous film, woven fabric, or non-woven fabric.

The cap assembly 220 may be coupled to the upper portion of the can 210, and may include a cap plate 240, an insulating plate 250, a terminal plate 260 and an electrode terminal 230. The cap plate 240 may be made of a metal plate having a size and a shape corresponding to the upper opening of the can 210. The cap plate 240 may have a terminal hole 241 of a predetermined size arranged at its center portion and an electrolyte injection hole 242 may be arranged at one side of the cap plate 240. After the electrolyte has been injected into the can 210 through the electrolyte injection hole 242, the electrolyte injection hole 242 may be sealed by means of a plug 243.

The electrode terminal 230 may be inserted into the terminal hole 241 and a tubular gasket 235 may be coupled to the outer surface of the electrode terminal 230 to electrically insulate the electrode terminal 230 from the cap plate 240. The insulating plate 250 may be arranged below the cap plate 240 and the terminal plate 260 may be arranged below the insulating plate 250. A lower portion of the electrode terminal 230 may be electrically coupled with the terminal plate 260. The insulating plate 250 may be interposed between the lower portion of the electrode terminal 230 and the terminal plate 260.

The first electrode tap 216 may be welded to the lower portion of the cap plate 240 and the second electrode tap 217 may be welded to the terminal plate 260. The first electrode tap 216 and the second electrode tap 217 may be made of nickel. In addition, insulating tape 218 may be wound around the exposed portions of the first electrode tap 216 and the second electrode tap 217 to prevent a short circuit between the first electrode 213 and the second electrode 215.

An insulating case 270 may be arranged at an upper portion of the electrode assembly 212 to electrically insulate the electrode assembly 212 from the cap assembly 220 and to fix the position of the electrode assembly 212, the first electrode tap 216, and the second electrode tap 217. The insulating case 270 may include a body section 271, protrusions 280 arranged at periphery portions of the body section 271, support flanges 273 and 274 arranged at both longitudinal end portions of the body section 271, and support blocks 275 and 276 arranged at long lateral sides of the body section 271. The insulating case 270 may also include an electrode tap hole 277 to provide a passage for drawing the second electrode tap 217, a recess 279 to provide a space for drawing the first electrode tap 216, and an electrolyte hole 278 to provide a passage to allow the electrolyte introduced through the electrolyte injection hole 242 to flow into the electrode assembly. An electrode tap with a polarity different from the polarity of the can 210 may be drawn through the electrode tap hole 277 to prevent a short circuit between the first electrode 213 and the second electrode 215.

The protrusions 280 may protrude toward the inner wall of the can 210. The protrusions 280 may allow the insulating case 270 to make close contact with the can 210, which may prevent the insulating case 270 from moving in the can 210. Once the insulating case 270 has been arranged on the upper portion of the electrode assembly 212, the insulating case 270 is not moved. This prevents the electrode assembly 212 from moving and minimizes the movement of the first electrode tap 216 and the second electrode tap 217 to avoid a short circuit between the first electrode 213 and the second electrode 215.

The insulating case 270 may be made of a polymer resin having an insulating property, such as polypropylene (PP), polyphenylene sulfide (PPS), polyethersulfone (PES) or modified polyphenylene oxide (PPO). PPS has superior heat-resistance, dimensional stability, chemical-resistance, low water absorption, and non-flammable characteristics. In addition, the electrical characteristics of PPS are stable against temperature variation. PES is an amorphous aromatic heat-resistant plastic resin and has heat resistance up to 200° C. with superior dimensional stability and waterproof characteristics. In addition, PES has superior transparent characteristics and a high glass transition temperature ($T_g$; 223° C.), low expansion (CTE: $2.3 \times 10^{-5}$/° C.), and superior mechanical strength. Modified PPO is a non-flammable resin and has superior mechanical and heat-resistant characteristics as well as reduced molding shrinkage. In addition, the physical properties of modified PPO rarely change under low temperatures.

The insulating case 270 may be fabricated using an injection molding process, in which resin is melted by heating, and then poured into a mold under a high temperature atmosphere. The resin is then cooled for a predetermined period of time to solidify the melted resin. By this method, the protrusions 280 may be integrally formed with the body section 271 of the insulating case 270.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A lithium rechargeable battery, comprising:
an electrode assembly including a first electrode, a second electrode and a separator interposed between the first and second electrodes;
a metallic can for receiving the electrode assembly therein; and
an insulating case positioned at an upper portion of the electrode assembly, the insulating case comprising:
a flat type body section,
at least one protrusion protruding toward an inner wall of the metallic can and the protrusion contacting the inner wall of the metallic can, and
a recess formed in a long lateral side of the body section,
wherein the flat type body section has a bottom surface facing the electrode assembly,
wherein the protrusion has a bottom surface coextensive with the bottom surface of the flat type body section, wherein the flat type body section comprises the long lateral side comprising a first portion, a second portion comprising the recess, and a third portion comprising the at least one protrusion, wherein the first portion is arranged between the second portion and the third portion, and wherein a width of the first portion in a direction parallel to the long lateral side is greater than a width of the second portion in a direction parallel to the long lateral side.

2. The lithium rechargeable battery of claim 1,
wherein at least one protrusion is arranged at a periphery portion of the flat plate type body section.

3. The lithium rechargeable battery of claim 2,
wherein the protrusion is integrally formed with the body section.

4. The lithium rechargeable battery of claim 2,
wherein two pairs of protrusions are arranged at long lateral sides of the body section adjacent to corner portions of the body section.

5. The lithium rechargeable battery of claim 2,
wherein at least one pair of protrusions are arranged at center portions of long lateral sides of the body section.

6. The lithium rechargeable battery of claim 2,
wherein the insulating case comprises at least one support member arranged at a short lateral side or a long lateral side of the body section.

7. The lithium rechargeable battery of claim 6,
wherein the support member protrudes upward from the top surface of the body section, the top surface of the body section being opposite the bottom surface.

8. The lithium rechargeable battery of claim 6,
wherein the support member is integrally formed with the body section.

9. The lithium rechargeable battery of claim 2,
wherein an electrode tap hole is arranged in the body section.

10. The lithium rechargeable battery of claim 2,
wherein an electrolyte hole is arranged in the body section.

11. The lithium rechargeable battery of claim 1,
wherein the protrusion has a semicircular sectional shape or a rectangular sectional shape.

12. The lithium rechargeable battery of claim 1,
wherein the insulating case comprises a polymer resin having an insulating property.

13. The lithium rechargeable battery of claim 12,
wherein the polymer resin is one selected from the group consisting of polypropylene, polyphenylene sulfide, polyethersulfone and modified polyphenylene oxide.

14. The lithium rechargeable battery of claim 1,
wherein the insulating case has a first width at a first distal end, a second width at a second distal end opposite the first distal end, and a third width at a portion comprising the at least one protrusion, wherein the third width exceeds both the first width and the second width.

15. The lithium rechargeable battery of claim 14, wherein the first width equals the second width.

16. The lithium rechargeable battery of claim 1, wherein the insulating case comprises the long lateral side comprising the recess, a side portion, and the at least one protrusion protruding from the side portion.

17. The lithium rechargeable battery of claim 16, wherein a first distance measured from an outermost point of the protrusion to a centerline of the insulating case that is parallel with the long lateral side exceeds a second distance measured from an outermost point of the side portion to the centerline and a third distance measured from an outermost point of the recess to the centerline.

18. The lithium rechargeable battery of claim 7,
wherein the support member comprises a lateral wall comprising a top edge opposite the top surface of the body section, and two end edges each connected to the top edge and the top surface of the body section, a side opening being defined on three sides by adjacent end edges of at least one support member and the upper surface of the body section, and the at least one protrusion is disposed at the side opening.

19. The lithium rechargeable battery of claim 18,
wherein at least one additional protrusion is disposed at the support member.

20. The lithium rechargeable battery of claim 1,
wherein the recess is concave with respect to the first portion, and the at least one protrusion is convex with respect to the first portion.

* * * * *